United States Patent [19]

Simonin et al.

[11] Patent Number: 5,327,352
[45] Date of Patent: Jul. 5, 1994

[54] METHOD AND DEVICE FOR CONTROLLING ONE OR MOR AXES IN A MACHINE TOOL

[75] Inventors: Jean C. Simonin; Cedric Paroz, both of Moutier, Switzerland

[73] Assignee: Tornos-Bechler SA, Moutier, Switzerland

[21] Appl. No.: 719,618

[22] Filed: Jun. 24, 1991

[30] Foreign Application Priority Data

Sep. 4, 1990 [CH] Switzerland .................. 2869/90

[51] Int. Cl.$^5$ .................................................. G05B 19/18
[52] U.S. Cl. ............................ 364/474.28; 364/474.12
[58] Field of Search .................. 364/474.12, 474.28, 364/474.16–474.19, 474.34, 474.35, 167.01; 318/570, 573, 603, 696; 112/121.12

[56] References Cited

U.S. PATENT DOCUMENTS

| | | |
|---|---|---|
| 3,015,806 | 1/1962 | Wang et al. . |
| 3,838,258 | 9/1974 | Logan . |
| 4,131,837 | 12/1978 | Whetham ................ 364/474.28 |
| 4,135,459 | 1/1979 | Manabe et al. ............ 112/112.12 |
| 4,266,170 | 5/1981 | Inoue . |
| 4,404,507 | 9/1983 | Dean et al. ............. 364/474.12 |
| 4,489,260 | 12/1984 | Matsushita . |
| 4,675,825 | 6/1987 | DeMenthon . |
| 4,692,856 | 9/1987 | Komiya ................ 364/474.28 |

FOREIGN PATENT DOCUMENTS 2072379 9/1981 United Kingdom .

OTHER PUBLICATIONS

Optics and laser technology, K. C. A. Crane et. al., A microcomputer-controlled X-Y ... applications, Apr. 1984, pp. 87-92.

*Primary Examiner*—Jerry Smith
*Assistant Examiner*—Steven R. Garland
*Attorney, Agent, or Firm*—Oliff & Berridge

[57] ABSTRACT

The control device comprises a computer program. The machining of a workpiece comprises the writing of a program, the essential element of which is a step table. Starting from a predetermined profile of the workpiece, the movements of the X- and Y-axes are plotted in successive steps, and the cumulated intervals of time for obtaining the required movements, as a function of the characteristics of the machine tool and of the workpiece, are stored in the form of a table containing the movements $\Delta t_{xi}$ and the movements $\Delta t_{yi}$. The reading of the steps, carried out as a function of an appropriate clock signal generator, brings about the successive transmission of the pulses which cause the X- and Y-axes to take their successive steps.

20 Claims, 6 Drawing Sheets

| Δx | Δy |
|----|----|
| 4  | 0  |
| 2  | 2  |
| 2  | 2  |
| 4  | 2  |
| 4  | 2  |
| 1  | 0  |
| 1  | 0  |
| 1  | 0  |
| 1  | 0  |

METHOD AND DEVICE FOR CONTROLLING ONE OR MOR AXES IN A MACHINE TOOL

BACKGROUND OF THE INVENTION

This invention relates to the control of machine tools, and more particularly to a method of controlling programmed movements effected by a plurality of actuators actuating one or more moving parts of a machine tool so as to carry out a machining operation on a rough workpiece fixed to a workpiece holder of this machine tool. The invention further relates to a device for controlling one or more axes in a machine tool, of the type having a driving motor on each axis and, for all the axes, a numerical data memory and a program capable of distributing a series of movement orders to each motor.

Conventional machine tools of the mechanical type, e.g., automatic lathes, are known to comprise cams, i.e., mechanical parts containing the program for machining the workpieces. Each cam communicates a movement to the tool by a description of the evolute of its profile. The connection between the feeler and the cam is continuously maintained so that the position of the tool is at all times a function of the radius of the cam at the location where it is in contact with the feeler. Such a control may be likened to an open-loop control.

In recent years, besides these conventional machines, so-called NC (numerically controlled) machines have been developed. The various "axes" of the machine are actuated by actuators. The program calculates a sequence of instructions which are transmitted to regulators, and the motors of the different axes are controlled by these regulators. The control is of the closed-loop type. A sensor gives the position of the axis at all times, so that a comparison can be made between the reference value and the actual value. The deviation determines an adjustment movement.

SUMMARY OF THE INVENTION

It is an object of this invention to provide an improved control method and device which combine the advantages (speed of execution, simplicity) of cam machines and those (simplification of the starting-up operations) of NC machines through a particular arrangement of the control device and a concept, differing from that found in the usual NC machines, of the data to be stored for the control and monitoring of the movements of the axes.

To this end, in the control method according to the present invention, a plurality of sequences of movement orders are established, each of these sequences of orders being assigned to one of the actuators, and a series of intervals of time, which determine the programmed execution of the movement orders, and the sequences of movement orders and the series of intervals of time are loaded into a memory allocated to the machine tool.

In the control device according to the present invention, of the type initially mentioned, the motors are incremental or incrementally operating motors, and the numerical data comprise a step table, the indications of which are distributed to the motors in the form of orders of increments at predetermined times compatible with the dynamics of the machine tool.

Thus, the invention resides principally in the fact that the simplicity of the open-loop cam-type control system is associated with the flexibility of modern actuators, which may be electric motors, hydraulic axes, etc. A workpiece program can then be changed within a very short time as compared with that required for cam machines. Moreover, the possible variety of programs is no longer limited by the finished size of the cams. With the inventive device, however, the advantage of the cam system, consisting in a fully reliable open-loop operation, is retained.

According to one of the features of the invention, incremental or incrementally operating motors are used for each axis. Such motors are, for example, stepping motors or motors equipped with control systems and operating analogously to stepping motors. An incremental motor within the meaning of the present specification may also be a hydraulic actuator, e.g., a controlled jack.

Another essential feature of the invention is the concept of what is called the step table. The structure, operation, and development of the step table will be explained below.

BRIEF DESCRIPTION OF THE DRAWINGS

Preferred embodiments of the invention and their implementation will now be described in detail with reference to the accompanying drawings, in which.

DETAILED DESCRIPTION OF PREFERRED EMBODIMENTS

The overall design of the machining apparatus equipped with the device to be described does not present any special particularities. The different axes are driven by incremental or incrementally operating motors.

The control device comprises a computer program. The machining of a workpiece comprises the writing of a program having as its essential element a step table. Starting from a predetermined profile of a workpiece P, the movements of the X- and Y-axes are traced step by step; and the cumulated intervals of time for producing the required movements, as a function of the characteristics of the machine and of the workpiece, are stored in the form of a table containing the movements $\Delta t_{xi}$ and the movements $\Delta t_{yi}$. Readings of the steps carried out as a function of a suitable clock signal generator bring about the successive transmission of pulses which cause the X- and Y-axes to take their successive steps.

Figure 1:
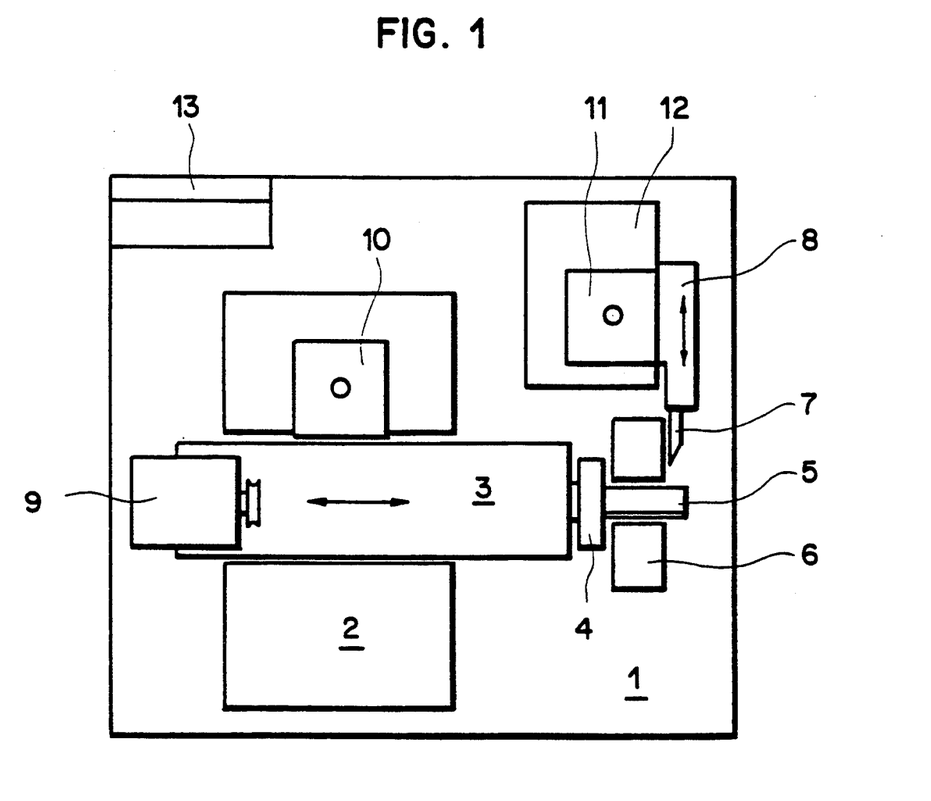
FIG. 1 is a diagrammatic top plan view of a lathe equipped with a control device according to the present invention.

In FIG. 1, a frame 2 disposed on a base plate 1 supports a headstock 3, the spindle of which is equipped with a chucking clamp 4. A bar 5 to be machined projects at the front of headstock 3 and passes through a barrel 6 so that the end of bar 5 is situated opposite a turning tool 7 integral with a tool slide 8. A spindle motor 9 rotates clamp 4. A headstock motor 10 causes headstock 3 to move forward and back. The controls for opening and closing clamp 4 are not shown. A motor 11 moves tool slide 8 on a guide-block 12 so as to control the radial position of the tool relative to the axis of rotation of bar 5. The machining of a repetitive profile on identical workpieces formed successively in bar 5 involves working in the X- and Y-axes, the X-axis taking the concrete form of motor 10, and the Y-axis of motor 11. The speed of rotation of the spindle is controlled by motor 9, which here is independent of the control device being described. It will be seen below that, in certain cases, the driving motor of the spindle may likewise be considered an axis.

Figure 2:
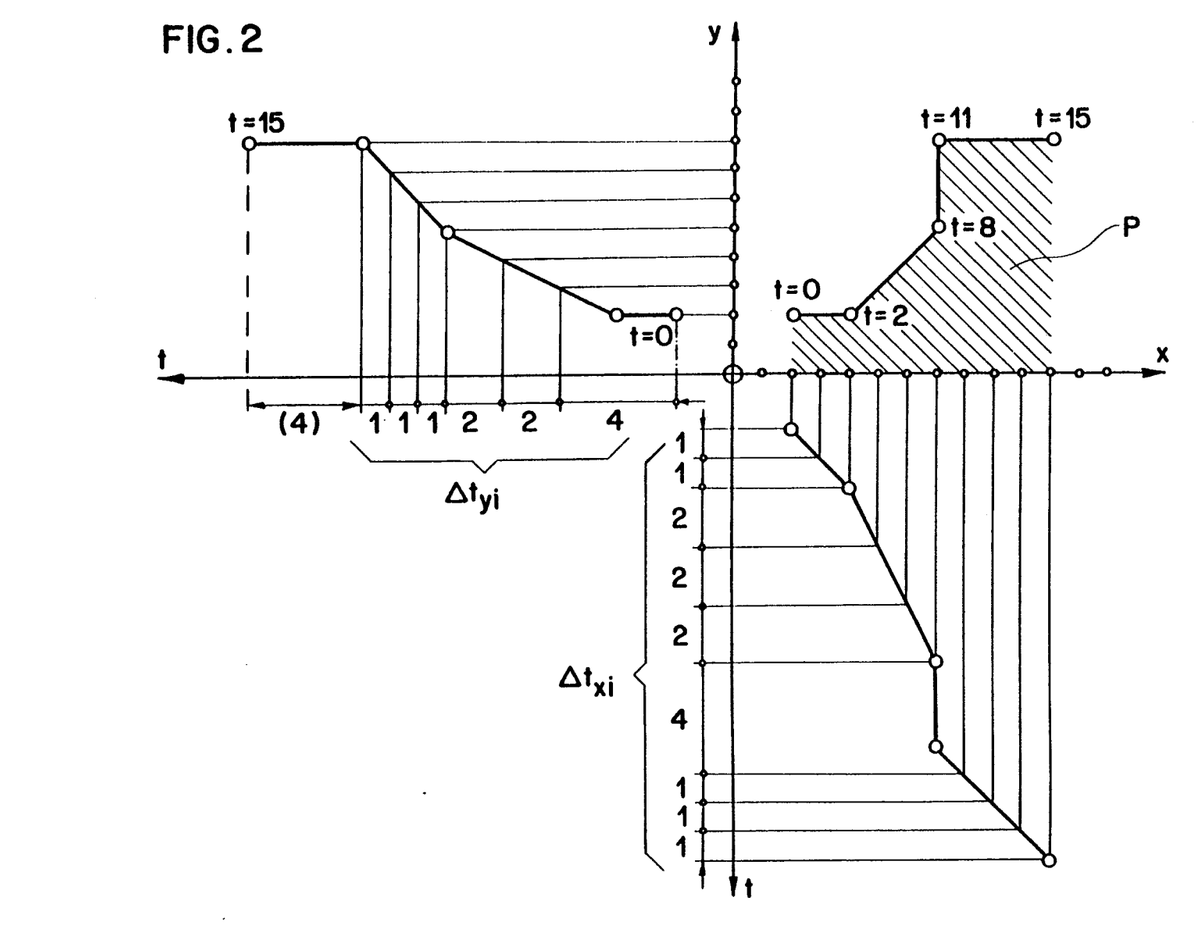
FIG. 2 is an auxiliary graph used in developing a step table for machining a workpiece having the profile shown in the upper right-hand corner of FIG. 2.

The graph in FIG. 2 explains the way to set up a step table capable of being incorporated in the electronic control device 13 of the machining apparatus. The profile of a workpiece P to be machined is depicted diagrammatically in the upper right-hand quadrant of the graph. Axis x represents the symmetry axis of the bar, and axis y the radial deviations of the tool relative to axis x. The operations to be effected are broken down into tool movements, which are in turn quantified in steps of a specific length, chosen in terms of the requirements imposed by the material and of an estimation of the most judicious movements. In this graph, the axis starting from the center and going horizontally toward the left, as well as the one starting from the center and going vertically downward, are time axes. The radial movements of the tool are plotted on axis y, while the movements of the headstock are plotted on axis x. The point of origin of the machining is the point designated as $t=0$. Searching for this origin position when machining each workpiece will be discussed below. Starting from this point $t=0$, the path of the tool depicted in the upper right-hand quadrant of the graph is broken down into segments. The lower right-hand quadrant shows the successive axial movements of the headstock as a function of time, and the upper left-hand quadrant the successive movements of the tool as a function of time. These movements are broken down into fixed steps as a function of successive, variable intervals of time designated as $\Delta t$. The $\Delta t_{xi}$ are a sequence of intervals of time, at the end of each of which the headstock must have moved by one step, i.e., its motor must have received an order to effect one increment. It is seen that between the time $t=0$ and the time $t=2$, the X-axis must have effected one increment after each interval of time, whereas between the time $t=2$ and the time $t=8$, the headstock must effect one increment over two successive intervals of time. Between the time $t=8$ and the time $t=11$, the headstock makes no movement, while in the intervals of time which follow the time $t=11$ and up to the time $t=15$, the headstock effects one increment at each interval $\Delta t_x$.

As for the movement of the tool, i.e., the Y-axis, an analogous breakdown takes place. Starting from the position of the tool at the time $t=0$, the sequence of intervals of time is reproduced on axis t toward the left, and the increments of the motor of the tool are plotted at ordinates so as to produce the curve of the upper left-hand quadrant between the time $t=0$ and the time $t=15$.

The sum of the intervals of time is the same for the Y-axis $(\Delta t_y)$ and for the X-axis $(\Delta t_x)$ (in this particular case, it is equal to 15, but this is, of course, a theoretical example). On the other hand, the distribution of the increment orders on each of the axes, as a function of the time elapsed, is different.

Figure 3:
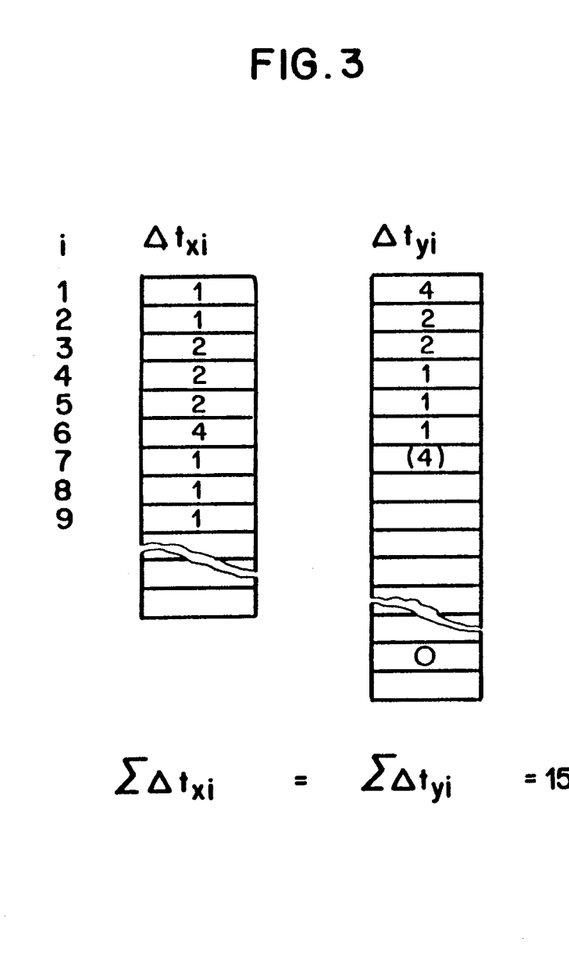
FIG. 3 is a diagram of the data contained in the step table which controls the program forming the profile of the workpiece referred to in FIG. 2.

The step table itself is shown in FIG. 3. Each of the columns $\Delta t_{xi}$ and $\Delta t_{yi}$ represents the number of intervals of time after which the corresponding axis must have moved by one increment. This table permits the control device to be programmed to machine a series of successive workpieces on bar 5 (FIG. 1).

It will also be noted in connection with FIG. 3 that, in certain cases, a reversal of the direction of movement of the tool may be required. In that case, the step table will comprise, for a particular position in the sequence of intervals of time $\Delta t_{yi}$, an instruction relating to a non-usual order (e.g., $\Delta t=0$), this order being interpreted as a reversal of the direction of movement of the Y-axis.

The program itself may easily be written on the basis of the recording of the step table. It is a repetitive program which actuates the X-axis and the Y-axis independently. The first operation consists in searching for the origin position; this is an operation known per se, which need not be stressed. Once the origin position has been found, the reading sequences are started on the $\Delta t_{xi}$ and on the $\Delta t_{yi}$.

Figure 4:
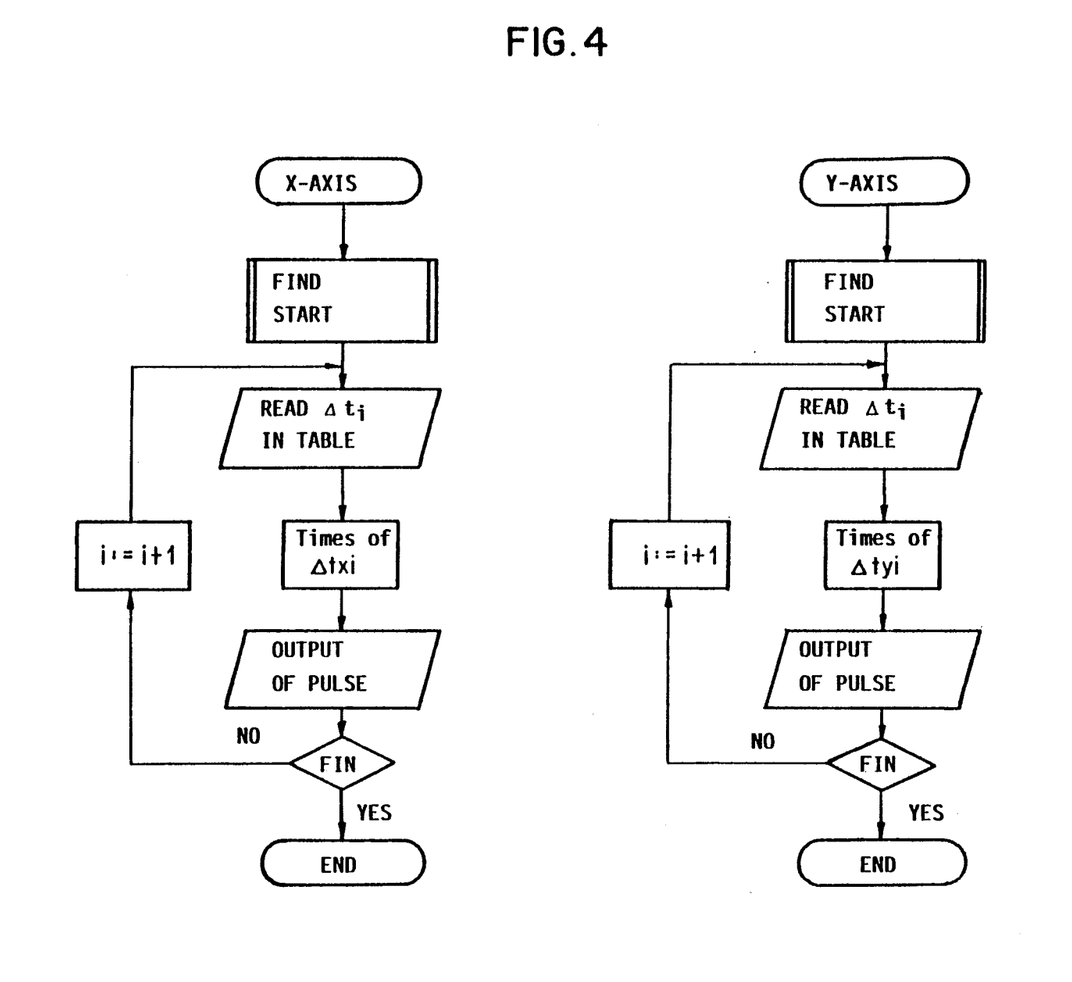
FIG. 4 is a partial, simplified flowchart illustrating the control of a turning tool during machining of the aforementioned workpiece.
Figure 5:
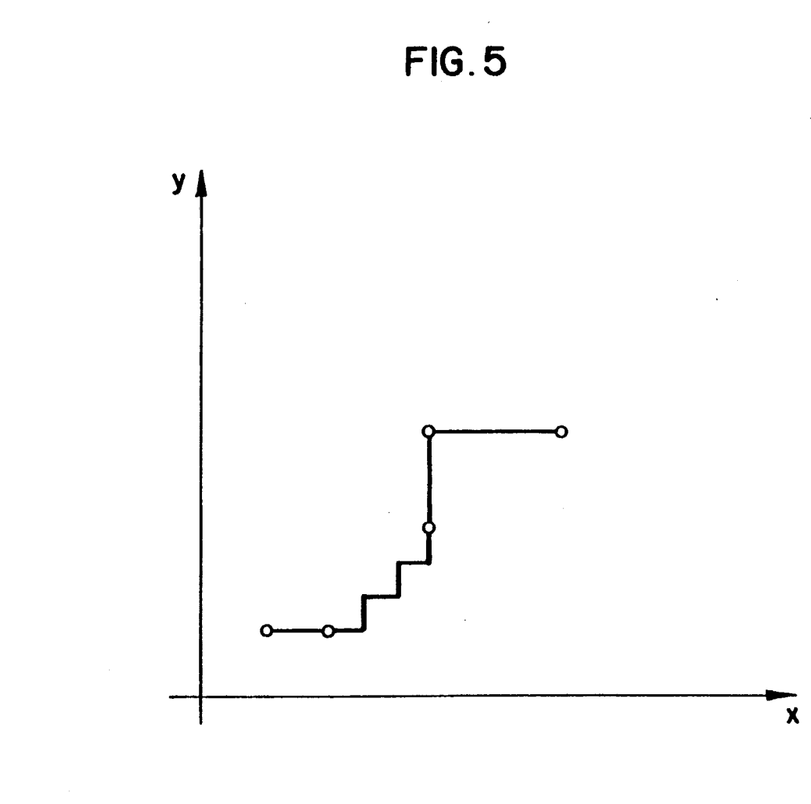
FIG. 5 is a detail drawing showing, in a highly simplified manner, the actual shape of the workpiece machined according to the diagram of FIG. 2, and FIGS. 6 and 7 are a graph and a diagram analogous to FIGS. 2 and 3, respectively, but relating to a modification of the step table.

The control device comprises a clock signal generator which determines the duration of the $\Delta t_i$. The numerical data contained in these tables always indicate the number of $\Delta t$ to be counted before a pulse is transmitted to the motor of the corresponding axis in order to move it by one increment. The flowcharts in FIG. 4 indicate the operations effected during each reading sequence. Each sequence includes the taking into account of the period of time corresponding to $\Delta t_{xi}$ or to $\Delta t_{yi}$, and the output of the following pulse is produced at the suitable moment. The actual profile of the machined workpiece is a profile whose appearance is as shown in FIG. 5. When the program is being written, the $\Delta t$ and the increments are to be chosen in such a way as to respect the dynamics of the system, considering the type of workpieces to be produced.

Figure 6:
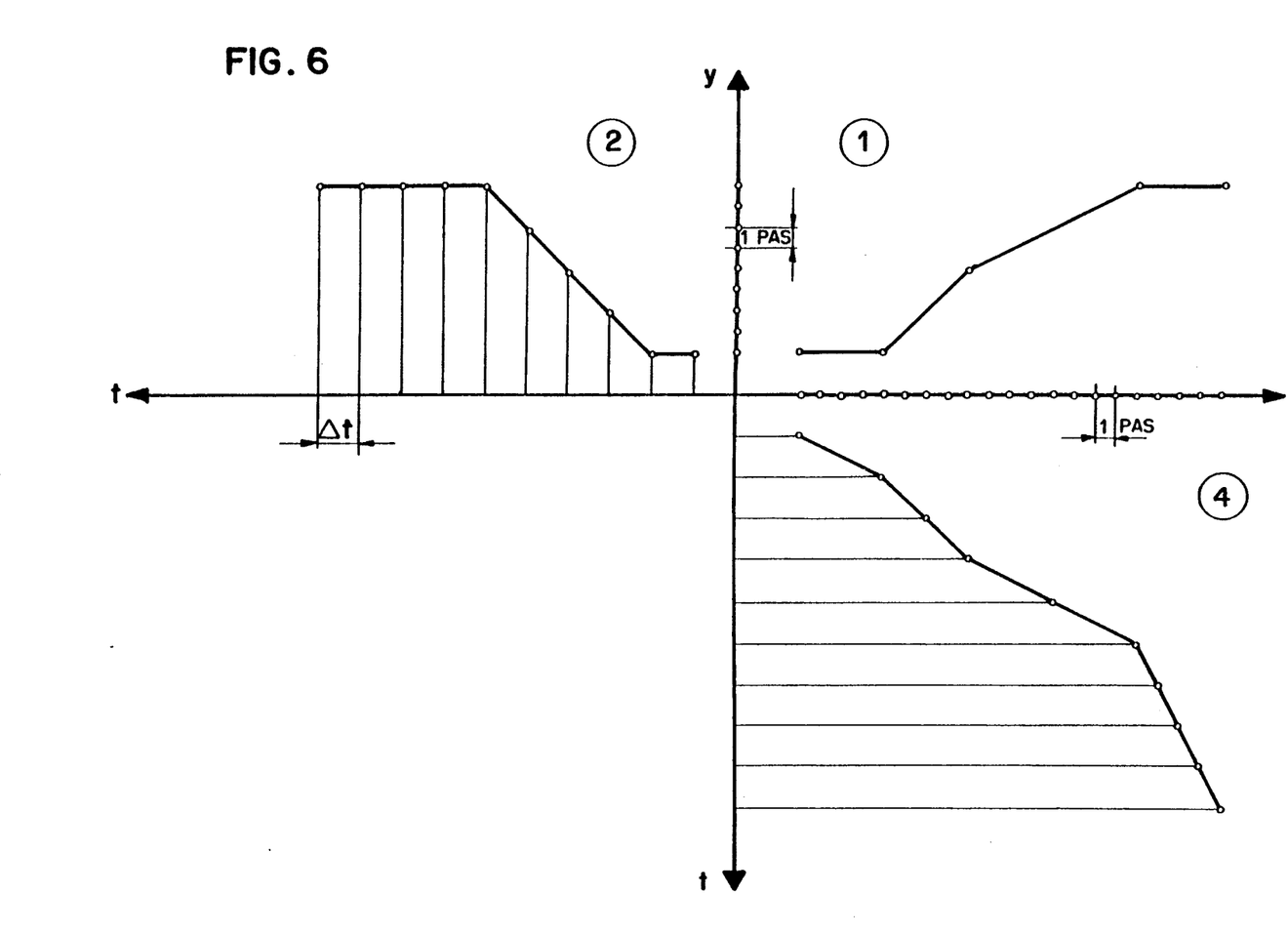

The graph in FIG. 6 explains a modification in setting up the step table to be incorporated in electronic control device 13 of the machining apparatus. The profile of a workpiece P to be machined, and the successive movements of the tool and of the headstock, are depicted in a manner analogous to FIG. 2. However, the movements are broken down into the number of steps as a function of fixed, successive intervals of time, designated as $\Delta t$. The $\Delta X_i$ and $\Delta Y_i$ are sequences of movements. At the end of each interval $\Delta t$, the headstock must have effected a prescribed movement $\Delta x$, i.e., equal to a prescribed number of steps. Thus, in FIG. 6, it is seen that at the end of the first $\Delta t$, the movement of the headstock must be four steps, etc.

As for the movement of the tool, i.e., the Y-axis, an analogous breakdown takes place. Starting from the position of the tool at the time $t=0$, the sequence of intervals of time is reproduced on axis t toward the left, and the increments of the motor of the tool are plotted at ordinates to produce the curve of the upper left-hand quadrant between the time $t=0$ and the time $t=9$.

Figure 7:
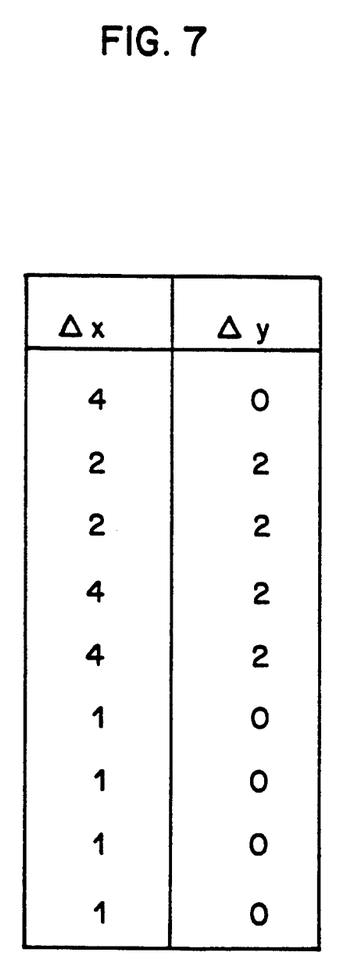

The step table itself is shown in FIG. 7. Each of the columns $\Delta t_{Xi}$ and $\Delta t_{yi}$ represents the number of steps the corresponding axis must effect at each $\Delta t$. This table permits the control device to be programmed so as to machine a series of successive workpieces on bar 5 (FIG. 1).

As stated in connection with FIG. 3, a reversal of the direction of movement of the tool may be required in certain cases. If so, the step table will comprise, for a particular position in the sequence of step intervals $\Delta t_{Xi}$, an instruction relating to a non-usual order (e.g., $\Delta Y = 100$), this order being interpreted as a reversal of the direction of movement of the Y-axis.

The control device comprises a generator of clock signals of the duration $\Delta t$ and synchronizes the reading of the step table on the X-axis and on the Y-axis. The numerical data contained in these tables always indicate the number of motor steps to be taken before the next pulse. During writing of the program, the increments are to be chosen so as to respect the dynamics of the system, considering the type of workpieces to be produced.

It is known that if the motors are stepping motors, each increment order necessarily brings the movable part dependent on the motor into a predetermined position, so that the open-loop operation is reliable as long as no stepping error and no discontinuity or lack of synchronization occurs. Writing of the program therefore needs no new checking of position and no interpolation. On the other hand, the steps provided must be compatible with the performances of the actuators.

A program may be provided for calculating the step table, capable of being carried out on a computer separate from the machine. Existing auxiliary software, e.g., the "TB-Logic" software of the present assignee, may be adapted for writing a step table program. In order to limit the size of these tables, it is possible to have recourse to means such as data compression, which allows the price of the computer memory to be reduced.

The step table having been calculated with a separate computer, it is then transferred into a control memory of the machine by any suitable means.

As stated above, the starting measurement of the point of origin at the beginning of each operation is an important program element. The measurement of the point of origin depends upon the actual position of the tip of the tool and, consequently, upon its degree of wear. The control device must therefore be equipped with a means permitting a shift of the point of origin in order to make possible a measurement of the point of origin capable of being corrected as a function of the characteristics of the tool. The shifting means must first of all permit a shift of initial point of origin as a function of the theoretical position of the tip of the tool relative to a reference on the axis, and then, if need be, a tool correction which modifies the origin position as a function of a possible variation of the shape of the tool as compared with its theoretical shape.

The shift of initial point of origin must be inserted in the program which calculates the step table, whereas the tool corrections will be made by shifting the point of origin, either upon each reading of the table in a zone without anticipated movement, reserved for a movement of limited extent, or outside the reading of the table.

When the machining of a workpiece requires co-ordination between the rotation of the spindle and the position of the tool, e.g., when a workpiece is to be threaded, or a polygonal shape is to be turned on the bar, or the spindle is to be used on the C-axis, the driving motor 9 of the spindle must operate like an axis incorporated in the program. In this case, the step table may comprise a sequence of information relating to the control of the spindle axis. However, in view of the heavy stress on this motor, it is also possible to have the reading speed of the step table, i.e., the actual duration of the intervals $\Delta t$, controlled by the speed of rotation of the spindle. In this case, the intervals $\Delta t$ are no longer directly calibrated by clock signals but depend upon the instantaneous speed of the spindle.

It has been indicated above that the risk of maladjustment or breakdown may be the result of a discontinuity or lack of synchronization of a stepping motor if, for example, the resistant torque becomes greater than the maximum motor torque. As it is an open-loop system, no feedback on the running of the program exists in this case.

For each actuator, or each motor actuating an axis, however, the control device will include a monitoring means capable of detecting any abnormal operation and of generating an alarm which will stop the running of the program. The detection means may comprise a detector of the movement of the movable part connected to the axis or of rotation of the motor. In this case, an additional sensor and an alarm system are provided. It is also possible to equip the electric part of the actuators with systems for detecting the loss of steps and to cause the alarm to go off when the course of the pulses is obviously such that the mechanical movement which ought to be produced by that pulse has not taken place. In this case, sensors reacting to the movements of the tangible mechanical parts are no longer necessary. The monitoring is carried out solely by electronic means.

In the embodiment described above, the actuators are stepping motors. It should be noted, however, that identical results may be obtained, for example, with a DC motor, providing it is equipped with a control system which, upon registering a pulse, necessarily brings about a movement of this motor of predetermined extent. It will be realized that this procedure allows the use not only of stepping motors but also of position-controlled actuators, e.g., of the hydraulic type. The pulse received by this actuator then amounts to a new nominal position value.

What is claimed is:

1. A device for controlling one or more axes in a machine tool, comprising:
   an incrementally operating driving means on each of said axes,
   a memory for storing numerical data for all of said axes,
   a clock signal generator, and
   means for attributing to each said driving means a series of movement instructions in the form of increment orders transmitted at intervals of time established by said clock signal generator, said attributing means utilizing numerical data stored from a step table in accordance with a calculation of an optimum machining trajectory as a function of time, wherein said step table comprises for each of said axes a sequence of step orders opposite a series of intervals of time, each of said orders being attributed to one interval of time of said series of intervals of time, thus enabling said attributing means to order said driving means attributed to the respective one of said axes to effect a variable whole number of steps, said whole number being zero, one, or a whole number greater than one.

2. The control device of claim 1, wherein the data of said step table further determines for each of said axes a period of time for carrying out said whole number of steps.

3. The control device of claim 2, wherein at least one of said predetermined intervals of time brings about a reversal-of-direction order on at least one of said axes, said interval of time bringing about no other order.

4. The control device of claim 3, wherein said clock signal generator for determining said intervals of time counts said intervals and synchronizes the execution of said orders as a function thereof.

5. The control device of claim 4, wherein said intervals of time determined by said clock signal generator are of fixed duration.

6. The control device of claim 5, wherein said intervals of time determined by said clock signal generator are a function of a speed of rotation or movement observed on one of said axes.

7. The control device of claim 6, wherein said attributing means comprises means for repetitively carrying out, on each of said axes, origin-position searches each followed by a step-execution order, and further comprises an origin-position shifting means.

8. The control device of claim 7, further comprising means for detecting abnormal execution of the attributing by the attributing means and monitoring means stopping the running of said program upon detection of abnormal execution.

9. The control device of claim 8, wherein said means for detecting comprise, for at least one of said driving means of one of said axes, a step-loss detector associated with said driving means.

10. The control device of claim 8, further comprising a moving part associated with at least one of said axes, wherein said means for detecting comprise for said one of said axes a detector of movement of said moving part.

11. A method of controlling programmed movements effected by one or more incrementally operating driving means actuating one or more moving parts of a machine tool carrying out a machining operation on a rough workplace fixed to a workpiece holder of said machine tool, comprising the steps of:

calculating an optimum machining trajectory as a function of time, establishing a step table in accordance with said calculating step, said table permitting a given profile to be obtained with a given material, taking into account characteristics of the machine tool, and attributing to each driving means, by using numerical data stored from the step table, a series of incremental movement orders succeeding one another as a function of a time-dependent variable, the sequence of the orders being included in the step table, wherein the numerical data of the step table indicate for each movement a variable number of increments or steps to be carried out during a fixed number of units of time.

12. The control method of claim 11, wherein each movement order of the series is given in the form of a variable number of increments to be carried out during a given fixed interval of time corresponding to a fixed number of units of time, the variable number of increments being established in the step table.

13. The control method of claim 12, wherein the value of the unit of time corresponds to pulses transmitted by a clock signal generator.

14. The control method of claim 13, wherein the clock signal generator determines the intervals of time of fixed duration.

15. The control method of claim 13, wherein the clock signal generator determines intervals of time which are a function of a speed of rotation or movement of the machine tool.

16. The control method of claim 11, wherein the numerical data of the step table indicate for each movement the number of units of time after which the respective one or more driving means must have effected a movement of a fixed number of increments.

17. The control method of claim 16, wherein each movement order of the series is given in the form of a given fixed number of increments to be carried out during a variable interval of time, a duration of the intervals of time being established in the step table as a function of a variable number of units of time.

18. The control method of claim 17, wherein the value of the unit of time corresponds to pulses transmitted by a clock signal generator.

19. The control method of claim 18, wherein the clock signal generator determines the intervals of time of fixed duration.

20. The control method of claim 18, wherein the clock signal generator determines intervals of time which are a function of a speed of rotation or movement of the machine tool.

* * * * *

UNITED STATES PATENT AND TRADEMARK OFFICE
CERTIFICATE OF CORRECTION

PATENT NO. : 5,327,352

DATED : July 5, 1994

INVENTOR(S) : Simonin et al.

It is certified that error appears in the above-indentified patent and that said Letters Patent is hereby corrected as shown below:

On the title page, item [54], should read
— METHOD AND DEVICE FOR CONTROLLING ONE OR MORE AXES IN A MACHINE TOOL—; and item [75], should read — Jean-Claude Simonin—

Signed and Sealed this

Twenty-seventh Day of September, 1994

Attest:

BRUCE LEHMAN

Attesting Officer    Commissioner of Patents and Trademarks